United States Patent [19]
Kondo et al.

[11] Patent Number: 5,413,653
[45] Date of Patent: May 9, 1995

[54] APPARATUS AND METHOD FOR FORMING A GREEN TIRE

[75] Inventors: Kazuaki Kondo, Toyota; Masaaki Iimura, Fukushima, both of Japan

[73] Assignee: Sumitomo Rubber Industries, Ltd., Japan

[21] Appl. No.: 126,714

[22] Filed: Sep. 27, 1993

Related U.S. Application Data

[62] Division of Ser. No. 863,308, Sep. 14, 1992, Pat. No. 5,322,587.

[51] Int. Cl.$^6$ .............................. B29D 30/20
[52] U.S. Cl. ........................ 156/111; 156/126; 156/396; 156/406.2
[58] Field of Search ............... 156/406.2, 396, 398, 156/401, 403, 111, 131, 132, 135, 126

[56] References Cited

U.S. PATENT DOCUMENTS

| | | | |
|---|---|---|---|
| 3,740,292 | 6/1973 | Leblond | 156/406.2 |
| 4,039,366 | 8/1977 | Yabe | 156/406.2 |
| 4,093,495 | 6/1978 | Colombani | 156/406.2 |
| 4,685,992 | 8/1987 | Irie | 156/406.2 |
| 4,830,693 | 5/1989 | Okafuji | 156/132 |
| 5,141,587 | 8/1992 | Sumiuchi et al. | 156/396 |

FOREIGN PATENT DOCUMENTS

| | | | |
|---|---|---|---|
| 47-21836 | 6/1972 | Japan . | |
| 50-151282 | 12/1975 | Japan . | |
| 57-174236 | 10/1982 | Japan . | |
| 57-18739 | 11/1982 | Japan . | |
| 58-7339 | 1/1983 | Japan . | |
| 61-43545 | 3/1986 | Japan . | |
| 127337 | 6/1986 | Japan | 156/406.2 |
| 297128 | 12/1986 | Japan | 156/406.2 |
| 62-68732 | 3/1987 | Japan . | |
| 1-255528 | 10/1989 | Japan . | |
| 2092100 | 8/1982 | United Kingdom | 156/406.2 |

Primary Examiner—Geoffrey L. Knable

[57] ABSTRACT

A green tire forming apparatus comprises a belt forming mechanism (1), a transferring mechanism (2), a green tire forming mechanism (3), and bead setting mechanisms (4), (5); wherein the bead setting mechanisms (4), (5) have a function of pushing ply turn-up bladders, segments (24a) holding a belt-tread assembly (6) are driven by hydraulic cylinders (24b), and a green tire take-out mechanism (9) is added to the transferring mechanism (2). Accordingly, the number of elements required can be minimized, so that the structure of the apparatus can be simplified. In addition, when a green tire forming is carried out with the apparatus, production of defective tire due to undesirable expansion of the outer diameters of belt and tread can be prevented, and also green tire take-out can be carried out efficiently.

9 Claims, 10 Drawing Sheets

APPARATUS AND METHOD FOR FORMING A GREEN TIRE

This application is a divisional of application Ser. No. 07/863,308, filed on Sep. 14, 1992, now U.S. Pat. No. 5,322,587, the entire contents of which are hereby incorporated by reference.

TECHNICAL FIELD

The present invention relates to a green tire forming apparatus and a green tire forming method. More particularly, the present invention relates to an improvement of a green tire forming apparatus using a transferring equipment which is positioned between a green tire former and a belt former and is moved therebetween, and which transfers a belt-tread assembly formed by the belt former in order to set the assembly to a periphery of a green carcass to be toroidally shaped by the green tire former, and also relates to a green tire forming method using the apparatus.

BACKGROUND ART

In a conventional green tire forming technique, for example, as shown in FIG. 12, a belt-tread assembly is formed by a belt former 101 on one side; a green carcass is formed by a green-tire former 102 on the other side; beads are held by bead setting mechanisms 103A, 103B respectively; the beads are moved to be set at a predetermined positions on the tire former 102 by air cylinders 104A, 104B; the beads are fixed with the green carcass by extending the diameters of bead lock mechanisms integrated in a first and a second shoulder formers 106A, 106B; the belt-tread assembly formed by the belt former 101 is positioned on the periphery of the green carcass by a transferring mechanism 105; the green carcass is toroidally shaped by feeding shaping air inside the green carcass while moving both shoulder formers 106A, 106B inwardly to each other by, a driving mechanism (not shown); the belt-tread assembly is attached to the green carcass; both edges of the carcass ply are turned up around the beads by expanding ply turn-up bladders provided to the first and the second shoulder formers 106A, 106B; the ply turn-up bladders are further pressed from both outsides by expanding pressing bladders (for example, Japanese Examined Patent Publication No. 70548/1984) provided outside of the ply turn-up bladders the turned-up portion and the side walls of the carcass ply are firmly fixed to the body of the carcass to complete a green tire.

A conventional apparatus employed in this kind of green tire forming technique is generally much complicated in mechanism as mentioned above. In the apparatus, for example, the bead setting mechanisms (the bead setters 103A, 103B) for setting beads at predetermined positions on a green carcass arranged on a green tire former, and pressing mechanisms (pressing bladders) for pressing ply turn-up bladders from sides thereof are independently and separately provided.

Also, in the conventional tire forming apparatus, in order to hold and release belt-tread assembly the transferring mechanism utilizes a plurality of segments constituting an inner surface corresponding to the outer surface of the assembly, and a bladder or an air cylinder operated with air pressure for increasing or decreasing the inner diameter of an annular portion constituted by the segments, namely for extension or reduction of the segment. Accordingly, in holding the belt-tread assembly to position it at the periphery of the green carcass and combining the assembly with the green carcass which is shaped toroidaly, the air is pressurized to retreat the segments when the belt-tread assembly is pushed outward by expansion force of green carcass generated by inner pressure for shaping and the resulting pressurizing force is applied to the bladder or the air cylinder, the drive of the segments, via the segments. As a result, the outer diameter of the belt and tread are expanded undesirably, so that there arises a problem that a defective tire is produced. Further, when the belt-tread assembly is combined with the green carcass, as illustrated inside a dotted circle C in FIG. 11, both edges of the assembly are not firmly adhered to the green carcass, so that it is necessary to press the edges by a stitcher afterward. As a result, there also arises a problem that, when pressurizing, the breaker edge is deformed, or cords are snaked or separated whereby the uniformity of a tire is badly influenced.

Further, in order to take out a produced green tire from the tire former, an exclusive take-out mechanism is provided separately, or the segments of the transferring mechanism are utilized. However, there are such drawbacks that the apparatus becomes complicated when the take-out mechanism is separately provided, and it takes much time for taking out the produced green tire from the transferring mechanism when the segment are used.

The present invention is made to solve the abovementioned drawbacks of the conventional art. It is an object of the present invention is to provide a green tire forming apparatus and a green tire forming method; wherein constructions of the bead setter and the ply turn-up bladder mechanism are simplified sharply, each segment of belt transferring mechanism is maintained at the predetermined position against the expansion force of the carcass when the belt-tread assembly are combined with the green carcass whereby the undesirable expansion of the outside diameters of belt and tread are prevented and production of defective tire is reduced, and it is easy to take out the green tire whereby operation efficiency is improved.

That is, it is an object of a first aspect of the present invention to provide a green tire forming apparatus and a method for forming the green tire; the main aim or which is to simplify the construction thereof by employing a construction wherein a function for pressing the ply turn-up bladder is added to the bead setting mechanism and the bead setting mechanism is moved to the tire former side by the transferring mechanism.

Also, it is an object of a second aspect of the present invention to provide a green tire forming apparatus of which main aim is to prevent the outside diameters of belt and tread from undesirably expanding in toroidal shaping of green carcass by employing a hydraulic mechanism as a driving means for expansion and reduction of each segment of the transferring mechanism.

Further, it is an object of a third aspect of the present invention to provide a green tire forming apparatus of which main aim is to improve the green tire take-out mechanism by integratedly combining the green tire take-out mechanism into the transferring mechanism.

DISCLOSURE OF THE INVENTION

The first aspect of the present invention relates to a green tire forming apparatus comprising a belt forming mechanism 1, a transferring mechanism 2, a green tire forming mechanism 3, a first bead setting mechanism 4, and a second bead setting mechanism 5; characterized in that 1. a first and a second shoulder former elements 35A, 35B of the green tire forming mechanism 3 have ply turn-up bladders 7;
2. the first bead setting mechanism 4 comprises a holding mechanism 41 positioned at one end of a driving shaft of the belt forming mechanism 1 and an element 42 for transferring a bead and pushing the ply turn-up bladder, wherein the element 42 is attachably and detachably hold by the holding mechanism 41;
3. the transferring mechanism 2 has a joint element 23 for jointing with the element 42, the element 42 is held by the joint element 23 and is moved to a bead setting position of the first shoulder former element 35A of the green tire forming mechanism 3, whereby the end plates of the element 42 can push the ply turn-up bladder 7 arranged to the first shoulder former element 35A when the bladder 7 is expanded; and
4. the element 53 for transferring the bead and pushing the ply turn-up bladders of the second bead setting mechanism 5 is moved, by a drive 54, to a bead setting position of the second shoulder former element 35B of the green tire forming mechanism 3, whereby the end plates of the element 53 can push the ply turn-up bladder 7 arranged to the second shoulder former element 35B when the bladder 7 is expanded.

The second aspect of the present invention relates to a green tire forming apparatus characterized in that each of a plurality of the belt-tread assembly holding elements 24 has a segment 24a and a hydraulic cylinder 24b which moves the segment 24a in the radial direction.

The third aspect of the present invention relates to a green tire forming apparatus characterized in that the transferring mechanism 2 has a green tire take-out mechanism 9 comprising a receiving bucket 91 for holding a green tire and a green tire pressing rollers 94 projected toward the green tire forming mechanism 3, the mechanism 9 being arranged to a part of the segments which is movable forward and backward in the radial direction.

A green tire forming method of the present invention is characterized in that it comprises a step wherein one element functioning both as a bead transfer and as a pusher for ply turn-up bladders is moved by a transferring mechanism for a belt-tread assembly and bead setting and ply turn-up at one side is finished; and a step wherein the other element functioning both as a bead transfer and as a pusher for ply turn-up bludders is moved by a drive and the other bead setting and ply turn-up at the other side is finished.

BEST MODE FOR CARRYING OUT THE INVENTION

Hereinafter, an embodiment of the present invention is explained based on the accompanying drawings. However, it should be noted that the present invention is not limited to the embodiment.

Figure 1:
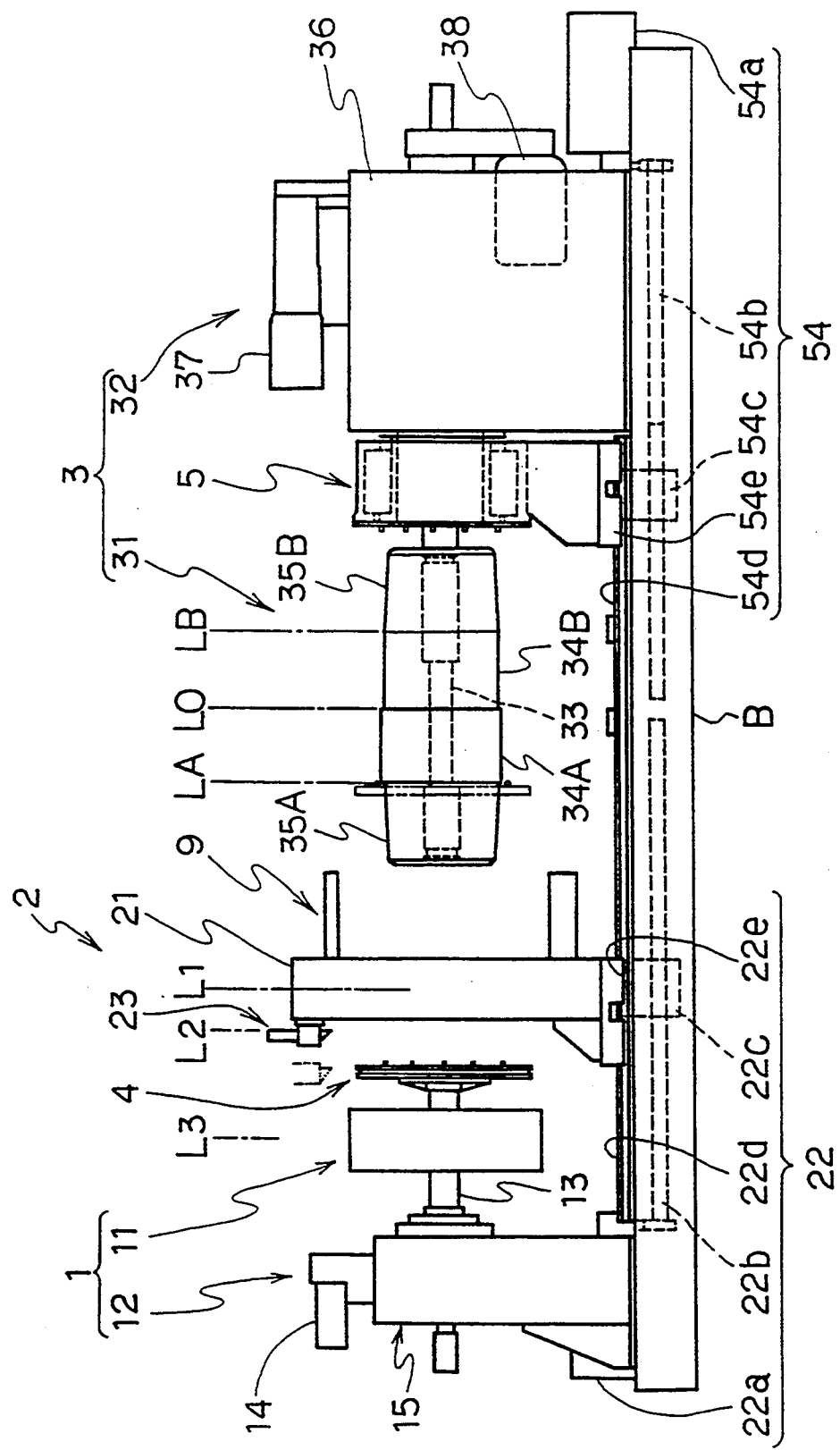
FIG. 1 is a front view showing a general construction of an embodiment of the present invention.

A green tire forming apparatus of an embodiment of the present invention, as shown generally in FIG. 1, comprises a belt forming mechanism 1, a transferring mechanism 2, a green tire forming mechanism 3, a first bead setting mechanism 4 and a second bead setting mechanism 5, each being arranged on a single base unit B.

A material feeding apparatus for the belt forming mechanism 1 and the green tire forming mechanism 3 is the same as a conventional one, and therefore, an explanation and an illustration therefor are omitted.

The belt forming mechanism 1 comprises a belt forming section 11 and a belt former driving section 12. The driving shaft 13 of the belt former driving section 12 has a free end penetrating through the belt forming section 11. The belt forming section 11 forms a belt-tread assembly 6 on its periphery (refer to FIG. 2). The construction of the belt forming section 11 is the same as a conventional one, and therefore the detailed explanation thereof is omitted. The driving section 12 comprises the driving shaft 13, a motor 14 for rotating the shaft 13 and a supporting element 15.

The transferring mechanism (hereinafter it is occasionally referred to as transferring) 2 comprises a ring-shaped frame element 21, a driving section 22 for moving the frame element 21, joint elements 23 for jointing with an element 42 for transferring a bead and pushing a ply turn-up bladder, and elements 24 for holding a belt-tread assembly (refer to FIGS. 4 to 5). The frame element 21 is reciprocately movable along the longitudinal direction of the base unit B between the belt forming mechanism 1 and the green tire forming mechanism 3 by driving the driving section 22. Any conventional ones used for this kind of driving mechanism can be employed as the driving section 22. As one example for the driving mechanisms, there is examplified a driving means comprising a motor 22a, a driving screw element 22b and a female screw block 22c coupled with the element 22b, a rail 22d and a slide element 22e slidably engaged with the slide rail.

As to the holding element 24 for holding the belt-tread assembly, it is disclosed later.

Figure 6:
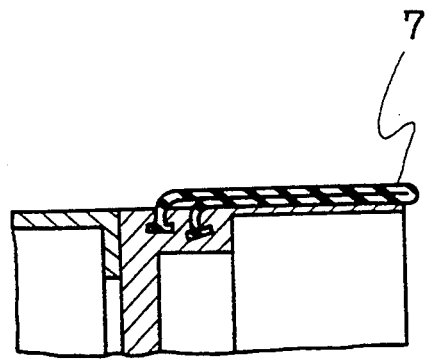
FIG. 6 is a schematic longitudinal fragmentary sectional view of a ply turn-up bladder.
Figure 7:
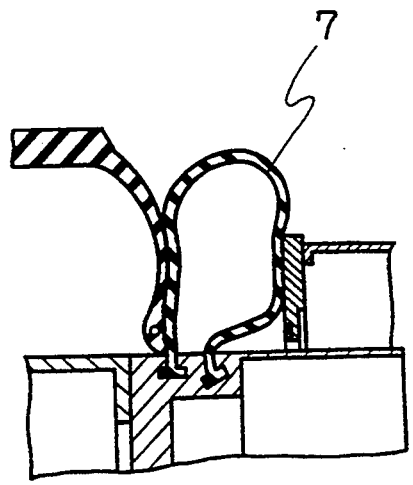
FIG. 7 is an explanatory illustration showing a state wherein a ply turn-up bladder is pushed by an element for transferring the bead and pushing the ply turn-up bladder.

The green tire forming mechanism 3 comprises a shaping former section 31 and a driving section 32 therefor. The shaping former section 31 is cantileveredly supported by a main shaft 33 projected from the driving section 32. The section 31 has shaping elements 34A, 34B of telescope type, and a first and a second shoulder former elements 35A, 35B. The shaping elements 34A, 34B of telescope type are solid cylinders respectively supported by the first and the second shoulder former elements 35A, 35B, and the diameters of the cylinders are slightly different from each other. Thereby, in shoulder shaping, at the time of the so-called bead-distance-shortening in which the first and the second shoulder former elements 35A, 35B inwardly approach to each other in an axial direction, one of the cylinders can telescopically go into the inside on the other cylinder, so that the former width is shortened. In the drawing, numeral 36 represents a supporting element 37 which cantileveringly supports and rotates the main shaft 33, and numeral 37 represents a motor for inwardly driving the first and the second shoulder former elements 35A, 35B. The numeral 38 represents a motor for driving the main shaft 33. As shown in FIGS. 6 to 7, the shaping former section 31 has a ply turn-up bladder 7 on the periphery of the first and the second shoulder former elements 35A, 35B, and has a bead lock mechanism (not shown) of known construction (for example, Japanese Examined Patent Publication No. 38097/1984) which enable the diameter thereof to expand and contract.

Figure 2:
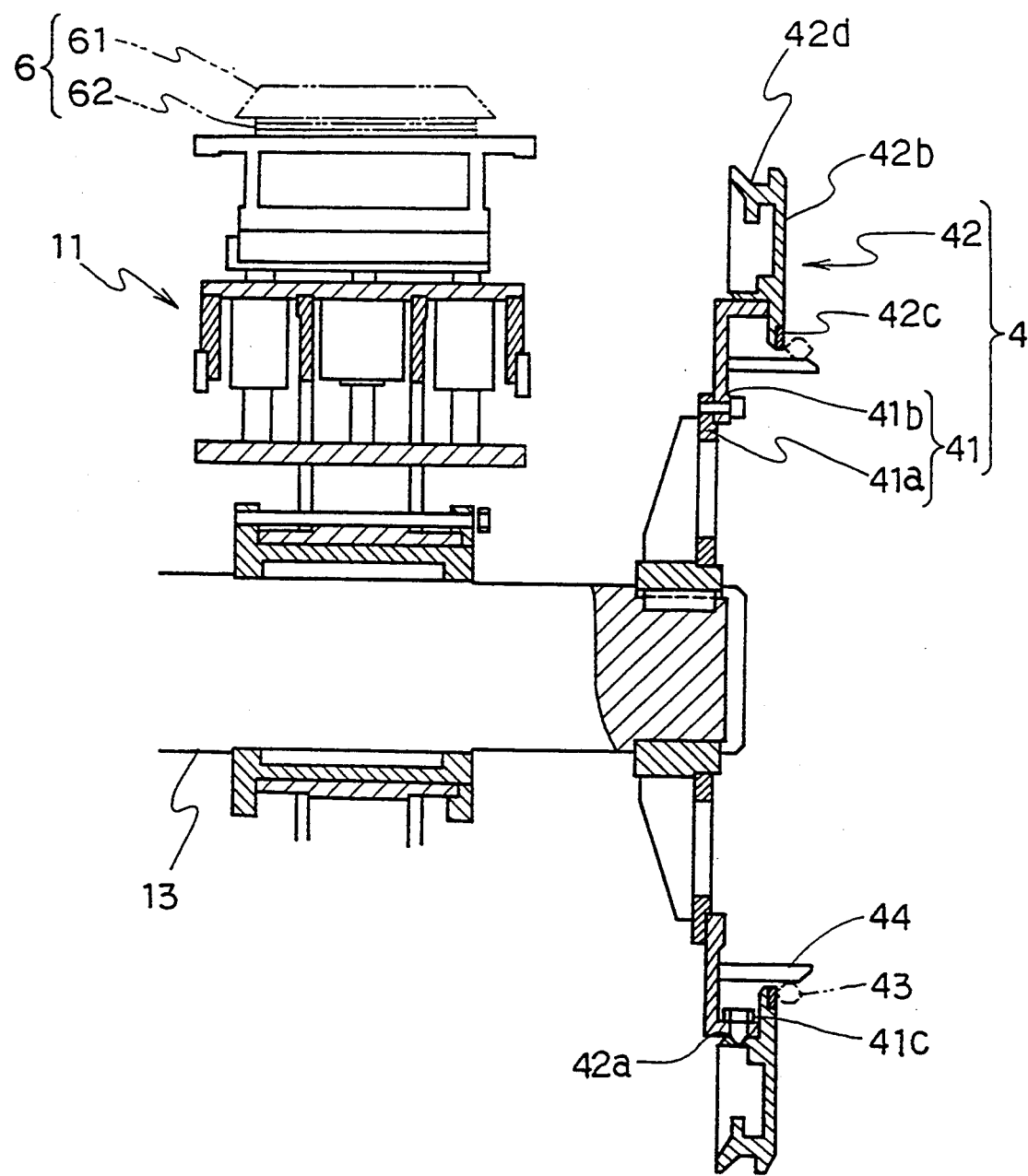
FIG. 2 is a sectional view of a belt forming section and a first bead setting mechanism.
Figure 3:
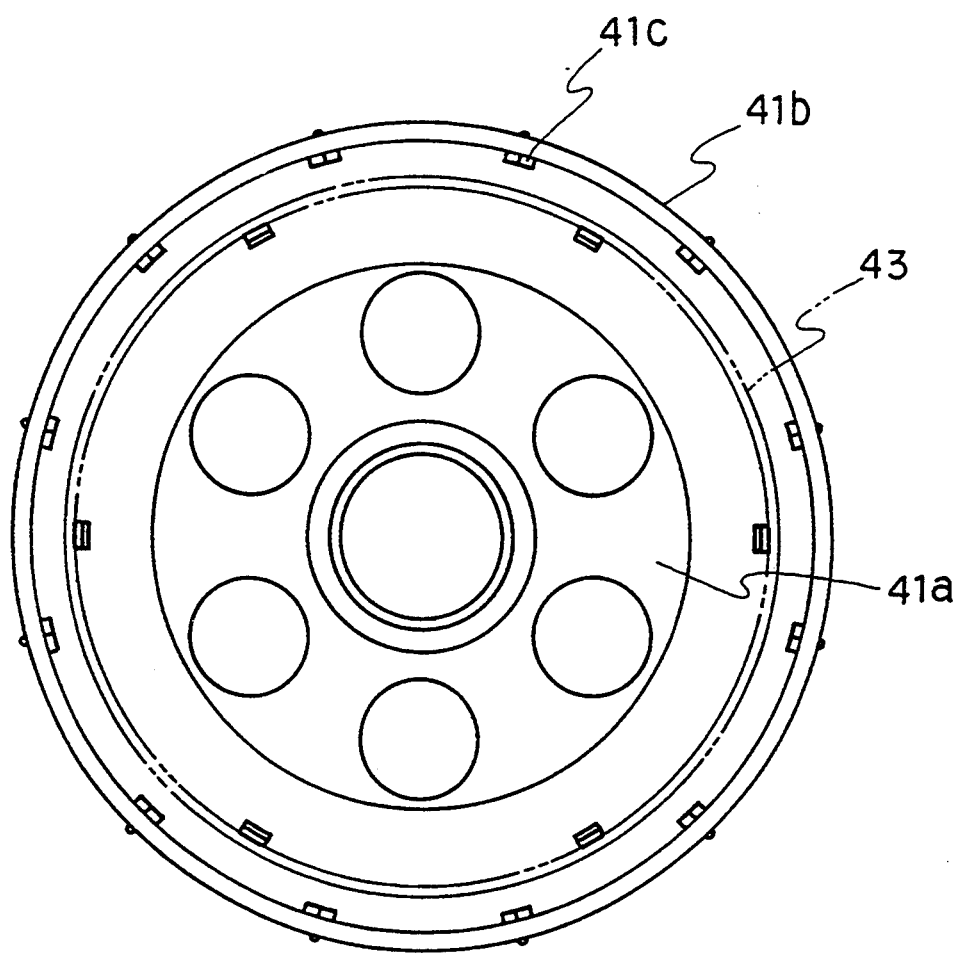
FIG. 3 is a front view of a holding element of the first bead setting mechanism.

At the free end of the driving shaft 13, the first bead setting mechanism 4 is arranged. As shown in FIGS. 2 to 3, the first bead setting mechanism 4 comprises a holding element 41 engaged with the free end of the driving shaft 13 and an element 42 for transferring a bead and pushing ply turn-up bladders detachably engaged with the holding elements 41. The holding element 41 of the first bead setting mechanism 4 comprises a disk-like element 41a engaged with the tip of the driving shaft 13 and a short cylindrical element 41b connected around the periphery of the disk-like element 41a. At the short cylindrical element 41b, bead supporting elements 44 are placed perpendicularly therefrom toward the green tire forming mechanism 3 so as to contact with the inner circumference of a bead 43 at six points, and thereby the bead 43 is positioned on an extended axis of the driving shaft 13. The element 42 is shaped in ring-like, as shown in FIG. 2, and is engaged with the outer circumference of the short cylindrical element 41b in such a manner that the element 42 is removed in the direction of the green tire forming mechanism 3. As shown in FIGS. 2 to 3, the engaging portion is constructed in such a manner that ball plungers 41c are arranged in the short cylindrical element 41b so that the tips of the ball plungers peep from the periphery of the element 41b, and a groove 42a is arranged at the inner surface, corresponding position to the ball plungers, of the element 42 so that the element 42 does not happen to drop out therefrom. In this jointed state, the end face 42b of the element 42 facing the tire forming section is formed flatly, and is positioned behind the tip of the bead supporting element by bead width. The end face 42b functions as pushing face for the ply turn-up bladder. In addition, a bead holding part 42c is formed, at a position of the end face 42b where the bead 43 contacts, by embedding permanent magnets for holding the bead 43. The bead holding part 42c attracts and holds a bead 43 when the bead 43 is supported by bead supporting elements 44. The bead holding part 42c is detachable. Further, on the periphery of the element 42 for transferring a bead and pushing ply turn-up bladders, a concave groove 42d is arranged as a part to joint with the joint elements 23.

Figure 4:
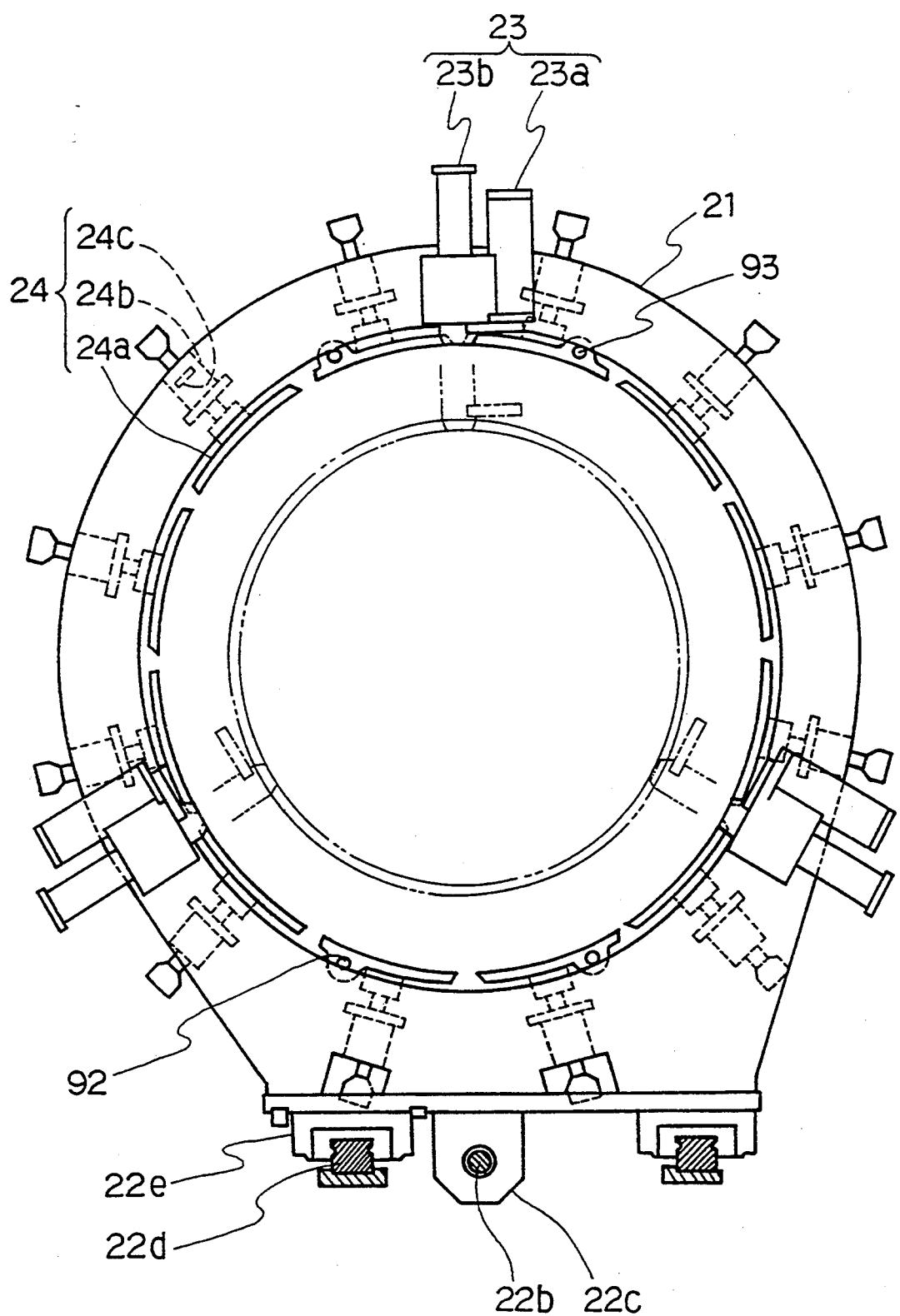
FIG. 4 is a front view of a transferring mechanism.
Figure 5:
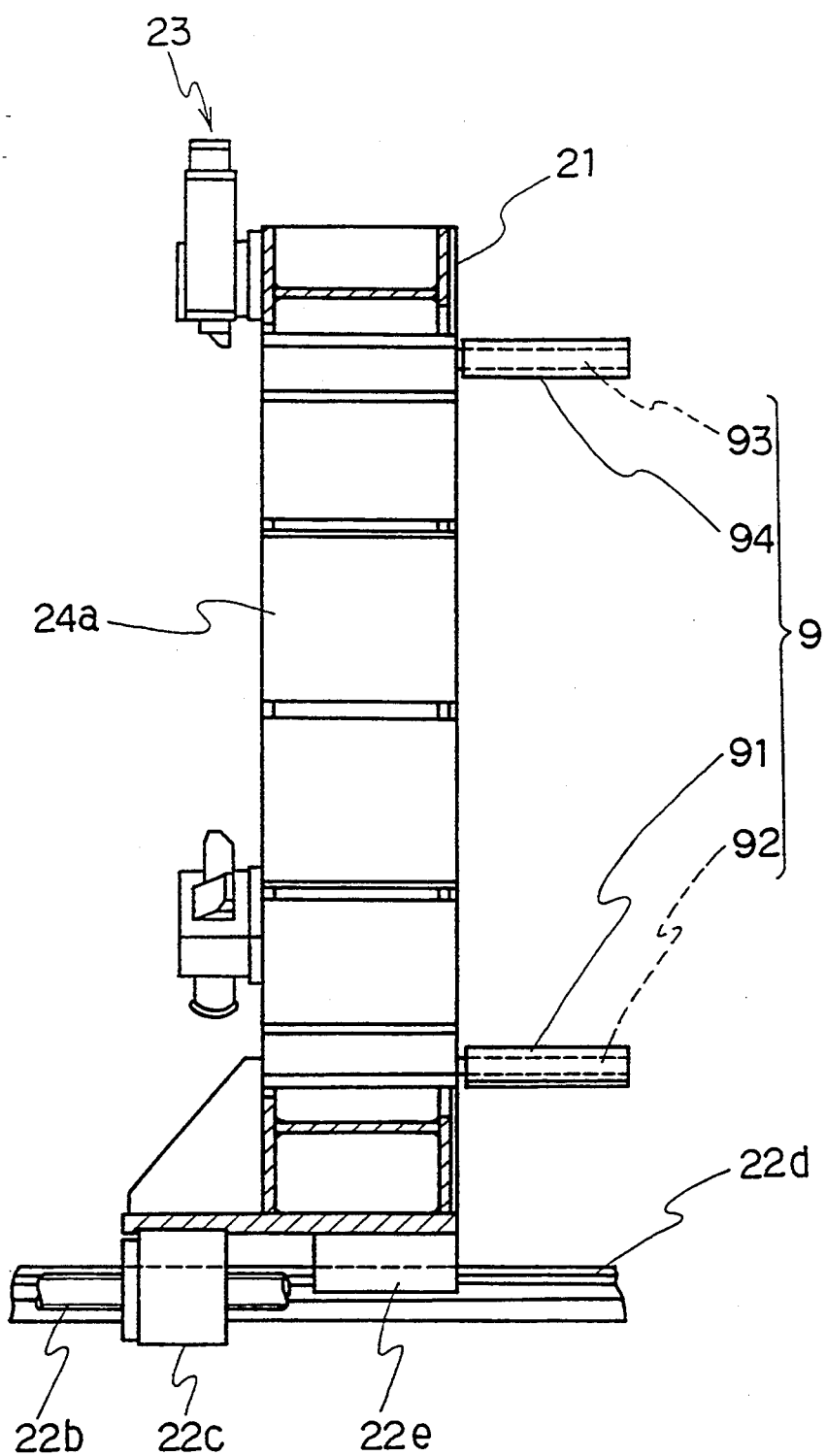
FIG. 5 is an axial sectional view of the transferring mechanism.

The joint element 23 comprises, as shown in FIGS. 1, 4 and 5, an air cylinder 23a and a joint piece 23b driven by the air cylinder 23a. Three joint elements 23 are arranged on the surface, facing to the belt former 11, of the ring shaped frame element 21. The joint pieces 23b are proceeded inwardly by driving the air cylinders 23a, and thereby the joint pieces 23b enter the concave groove 42d to engage with and hold the element 42.

Figure 8:
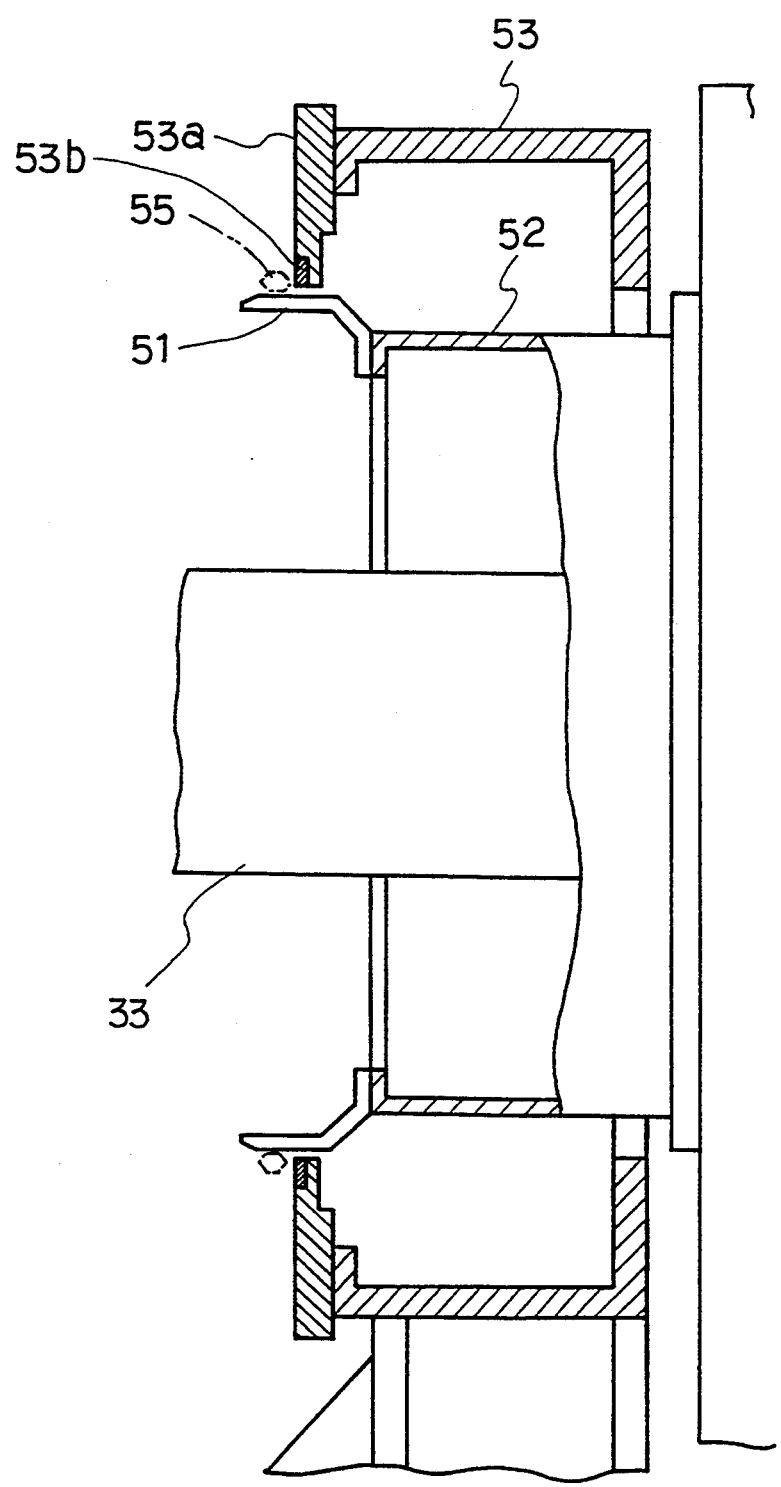
FIG. 8 is a sectional view of the main part of an element for transferring the bead and pushing the ply turn-up bladder of a second bead setting mechanism.

The second bead setting mechanism 5 comprises a bead holding element 51, a supporting element 52 therefor, a element 53 for transferring a bead and pushing ply turn-up bladders, and a driving portion 54 for the element 53. The supporting element 52 is fixed to the casing of the supporting element 36 in such a manner that the supporting element 52 is coaxial with the main shaft 33 as shown in FIGS. 1 and 8. On the surface, facing the shaping former section, of the supporting element 52 a bead holding element 51 is provided. Outside the bead holding element 51 and the supporting element 52, the element 53 for transferring a bead and pushing ply turn-up bladders is arranged. The element 53 is reciprocally movable between the shaping former section 31 and the driving section 32 by driving a driving portion 54 for the element 53. As the driving portion 54 for the element 53, any kind of conventional transferring mechanisms can be employed. As one example thereof, there is exemplified a mechanism comprising a motor 54a, a driving screw element 54b and a female screw block 54c coupled therewith, and a slide rail 54d and a slide block 54e slidably engaged therewith. Also, the surface 53a of the element 53 contacting with the bead is constructed similar to the surface 42b of the element 42 of the first bead setting mechanism 4. That is, a bead holding part 53b is arranged at a position with which the bead 55 contacts. Therefore, the element 53 for transferring a bead and pushing ply turn-up bladders can move with holding the bead 55, and can push the ply turn-up bladder.

Figure 9:
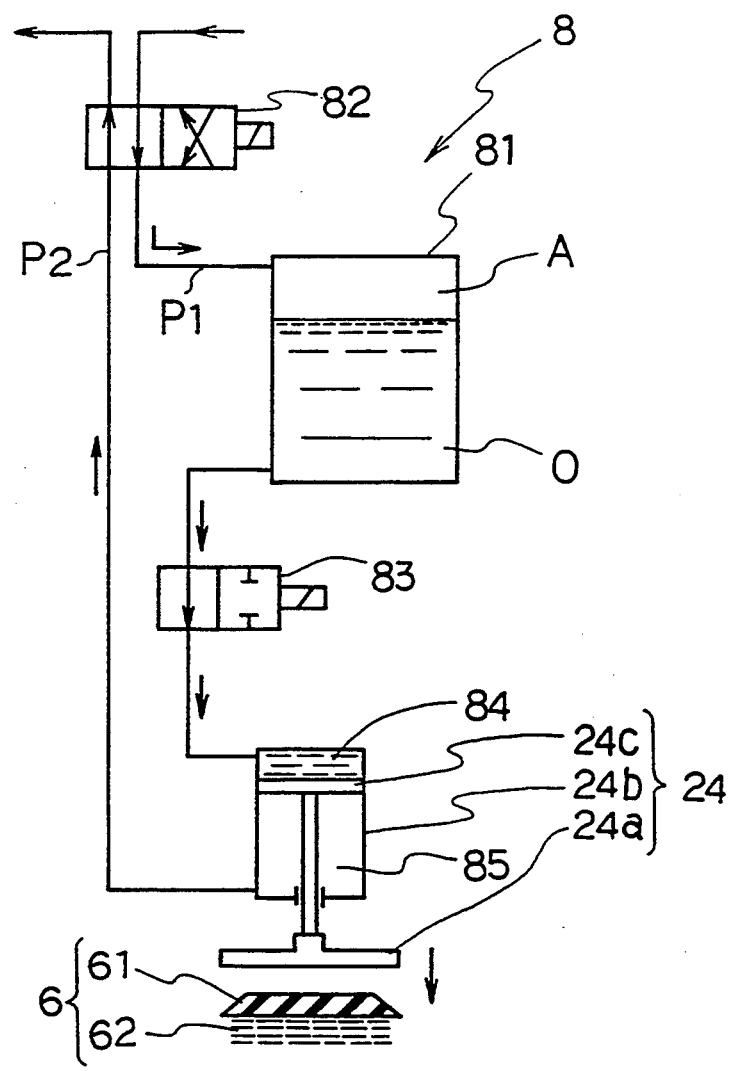
FIG. 9 is a general flow diagram of a driving system of a segment for holding a belt-tread assembly of the transferring mechanism.
Figure 10:
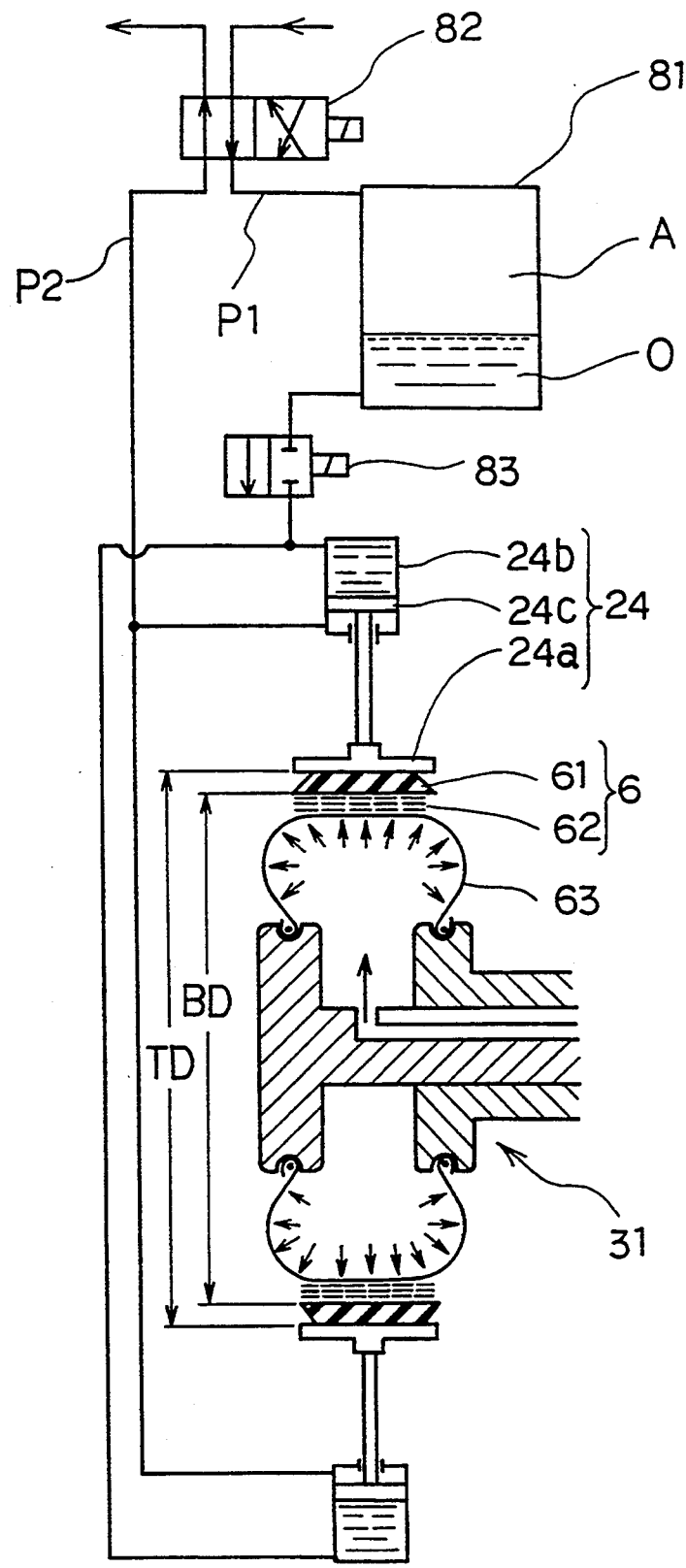
FIG. 10 is an explanatory illustration showing a forming operation by extending segments for holding a belt-tread assembly or the transferring mechanism.
Figure 12:
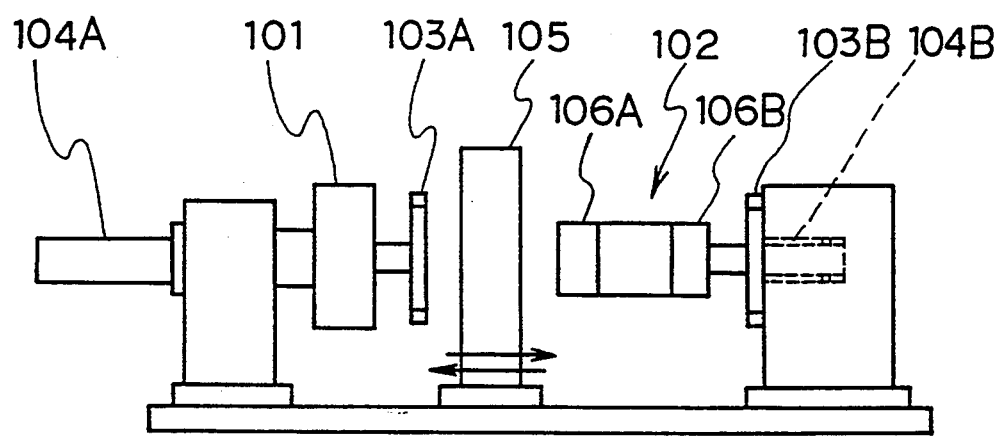
FIG. 12 is a schematic illustration of a conventional tire forming apparatus.

As shown in FIGS. 4 and 5, in the transferring mechanism 2, a plurality of holding elements 24 for holding the belt-tread assembly by touching the outer circumference of it are arranged, in a circumferential direction, on the periphery of the ring shaped frame element 21 in a manner That the holding elements 24 form annular shame. The holding element 24 comprises a segment 24a and a hydraulic cylinder 24b driving the segment 24a forward and backward in a radial direction. Each hydraulic cylinder 24b driving each segment 24a of the element 24 forward and backward in a radial direction is connected to a hydraulic driving apparatus 8 as shown in FIGS. 9 and 10.

Figure 11:
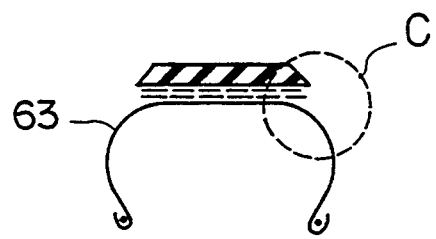
FIG. 11 is a schematic sectional view showing a part of a green tire to which no good adhesion easily occurs.

The hydraulic driving apparatus 8 comprises an air-hydraulic tank 81, an electromagnetic switching valve 82 for air, an electromagnetic switching valve 83 for oil, and piping connecting them with the hydraulic cylinders 24b. In the air-hydraulic tank 81, air A and oil O are filled up. Air is fed into an air-hydraulic tank 81 from an air source (not shown) through piping via the electromagnetic switching valve 82. Oil O filled up in the air hydraulic tank 81 is fed into an oil chamber 84 of the hydraulic cylinder 24b through piping via the electromagnetic switching valve 83. Air contained in an air chamber 85 of the hydraulic cylinder 24b is exhausted through the piping via the electromagnetic switching valve 82. FIG. 9 shows a state wherein in order to hold the belt-tread assembly 6 formed on the belt forming section 11 the segments 24a thereof are moving inwardly. That is, air is fed into the air-hydraulic tank 81 from the air source through piping p1, whereby oil is supplied to each cylinder 24b from the air-hydraulic tank 81 and simultaneously air contained in each cylinder 24b is exhausted through piping p2, so that each piston is pushed by the oil. As a result, each segment 24a moves toward the center in a radial direction, whereby each segment 24a contacts with and holds the belt-tread assembly 6. Thereafter, the diameter of the belt forming section 11 is decreased, whereby the belt-tread assembly can be removed from the belt forming section 11. In FIG. 9, when the electromagnetic switching valve 82 is switched, the air feeding side and the air exhausting side are changed mutually, whereby air is supplied through the piping p2 and air is exhausted through the piping p1, so that the piston 24c is pushed in a reverse direction. Thus, the segment 24a is moved backwardly from the center of the belt forming section 11. For example, after the belt-tread assembly 6 is adhered to the toroidally shaped green carcass 63 by pressing, the above-mentioned movement of the segment 24a is carried out. FIG. 10 shows a state wherein the transfer ring 2 is in a stand-by condition with positioning the belt-tread 6 assembly at a normal position (center) on the shaping former section 31, the green carcass 63 on the shaping former section 31 is toroidally shaped by the influence of the internal pressure IP thereby the green carcass 63 presses the belt-tread assembly 6 at the stand-by position, and the expansion force by the internal pressure IP for shaping (such force as to backwardly move the piston 24c of the hydraulic cylinder 24b of the transfer ring 2, namely the segment 24a) is generated. At this time, namely at the same time the shaping starts, the electromagnetic switching valve 83 for oil is switched to the closed position, so that oil is sealed in the oil chamber 84 of the hydraulic cylinder 24b. Since oil, unlike air, is imcompressible fluid, the piston 24c and the segment 24a are not moved backward by the expansion force generated by the internal pressure for shaping although oil pressure of the hydraulic cylinder 24b is raised when shaping is progressed. As a result, two functions: firstly, the outer diameter of belt BD and the outer diameter of tread TD are maintained at normal dimensions; and secondary, as shown in FIG. 10, the assembly of belt 62 and tread 61 are adhered to the shaped green carcass by pressing with being held by the segments 24a in a flat condition. Therefore, there are thoroughly dissolved, such defects, of a conventional system wherein the segments 24a are moved back and forth with air cylinders, that progress of the shaping causes the piston 24c and the segment 24a to be moved backward, whereby the respective outer diameters of belt and tread are undesirably expanded to make the green carcass become defective; and that because, as shown in FIG. 11 by a dotted circular line C, the belt-tread assembly 6 is adhered to the carcass the both edges thereof being not adhered when shaping is completed, both edges must be adhered to the carcass forcibly by using a statcher in the following step, so that braker edge is deformed, cord snaking or cord separation is happened to give bad influences on the uniformity of tire.

The hydraulic cylinder 24b is designed to stand the hydraulic pressure up to 210 kg/cm². A transferring which can move the segments 24a by using the hydraulic cylinders 24b can be applied not only to a former of the so-called telescope type but also to a forming apparatus in which shaping is carried out by using a former which enables a shoulder former such as a rubber former to move in a long distance (namely, to shorten the distance of the beads).

Further, in this embodiment, as shown in FIG. 5, the transfer mechanism 2 has a green tire take-out mechanism 9. The green tire take-out mechanism 9 comprises a green tire receiving bucket 91, bucket supporting elements 92, tire pressing roll shafts 93, and tire pressing rollers 94. The green tire receiving bucket 91 is formed in a circular arc in order to support the green tire thereon. The bucket supporting elements 92 are fixed to two of the segments 24a at the lower part of the transferring mechanism 2, and are extended toward the shaping former section 31 by about green tire width. The tire pressing roll shafts 93 are fixed to two of the segments 24a at the upper part of the transferring mechanism 2, and are extended toward the shaping former section 31 by about green width like the bucket supporting elements 92. The tire pressing roll 94 are rotatably supported by the roll shafts 93. It is preferable that the tire pressing shafts 93 are positioned corresponding with the bucket supporting elements 92. The green tire take-out mechanism 9 holds a green tire completed by the green tire forming mechanism 3 to take out, and the tire taken out is transferred to a transfer carrier by a worker.

Next, a green tire forming method using the green tire forming apparatus is described.

(1) As shown in FIG. 2, the element 42 for transferring a bead and pushing ply turn-up bladders of the first bead setting mechanism is held by the holding element 41 and is in a stand-by condition. In this condition, the bead 43 is set to the bead supporting element 44. On the other hand, as shown in FIG. 8, the element 53 for transferring a bead and pushing ply turn-up bladders of the second bead setting mechanism is similarly in a stand-by condition. In this condition, the bead 55 is set to the bead holding element 51.

(2) At this time, the transferring mechanism 2 is positioned at LA side by green tire width from the former center position L0 of the shaping former 31 shown in FIG. 1, and holds the completed green tire by means of the green tire take-out mechanism 9.

(3) In this condition, the transferring mechanism 2 returns to the stand-by position L1.

(4) When the transferring mechanism 2 returns to the stand-by position L1, the segments 24a are moved backward. Thus, the tire pressing rollers 94 which are supported by the transferring mechanism 2 through the segments 24a are raised, and at the same time the bucket 91 is moved downward, so that the green tire is released.

(5) The green tire is transferred to the transferring carrier from the bucket 91 by a worker.

(6) The transferring mechanism 2 is moved from the stand-by position L1 to the transferring position L2.

(7) The joint elements 23 of the transferring mechanism 2 are driven, and the joint pieces 23b are extended toward the center and jointed with the concave groove 42d, whereby the element 42 for transferring a bead and pushing ply turn-up bladders is held.

(8) The transferring mechanism 2 returns to the stand-by position L1. At this time, the bead 43 is attracted by the bead holding part 42c.

(9) Meanwhile, on the shaping former section 31 of which the first and the second shoulder former elements 35A, 35B are in fully expanded conditions, tire component materials are sequentially applied thereto to form a cylindrical green carcass.

(10) After the shaping of the green carcass is completed, the transferring mechanism 2 and the element 53 for transferring a bead and pushing ply turn-up bladders of the second bead setting mechanism 5 are moved toward the shaping former section 31. At this time, the bead 55 is attracted by bead holding part 53b of the elements 53.

(11) When the elements 42 and 53 reach the bead setting position LA, LB of the shaping former section 31 respectivly, the transferring mechanism 2 and the element 53 stop.

(12) The bead lock mechanisms of the first and the second shoulder former elements 35A, 35B are expanded to lift the carcass and the beads 43 and 55 touch the carcass to be fixed. At the same time, the transferring mechanism 2 returns to the stand-by position L1 and the elements 53 for transferring a bead and pushing ply turn-up bladders returns to the stand-by position respectively.

(13) The transferring mechanism 2 is moved to the transferring position L2.

(14) The joint pieces 23 of the transferring mechanism 2 are driven to move backward. As a result, the element 42 for transferring a bead and pushing ply turn-up bladders is released and then held by the holding element 41.

(15) The transferring mechanism 2 is moved to the former center L3 of the belt forming section 11.

(16) The belt-tread assembly holding elements 24 of the transferring mechanism 2 are driven, and thereby the segments 24a is moved toward the center. As a result, the diameter of the holding element 24 is decreased to hold the belt-tread assembly 6.

(17) The transferring mechanism 2 returns to the stand-by position L1.

(18) The transferring mechanism 2 is moved to the former center L0 of the shaping former section 31 to set the belt-tread assembly 6 to the green carcass on the shaping former section 31.

(19) The first and the second shoulder former elements 35A, 35B are driven by the motor 37 so that the shoulder former elements are moved toward the former center respectively from the fully expanded condition along the axis, thereby the distance between the beads is shortened.

(20) At the same time, internal pressure IP is supplied into the carcass and then shaping is started to shape the carcass toroidally.

(21) The first and the second shoulder former elements are closed. Shaping is progressed to the stopping position, and thereby the top of the carcass in toroidal shape is applied with pressure to the belt-tread assembly 6 in stand-by position.

(22) Tread shoulder is applied with pressure by a statcher.

(23) The transferring mechanism 2 is returned to the stand-by position L1.

(24) The transferring mechanism 2 is moved to the transferring position L2 to receive the element 42 for transferring a bead and pushing ply turn-up bladders (without bead), and returns to the stand-by position L1.

(25) The turn-up bladders 7, 7 of the first and the second shoulder former element 35A, 35B are expanded to turn up the side wall and edge of ply around the beads.

(26) After a predetermined period of time has passed, the element 42 held by the transferring mechanism 2 and the element 53 are mutually moved toward the shaping former section 31. Then, the bladders 7, 7 under expansion are pushed respectively by the edge plate 42a and 53a to the predetermined pressing limit, and thereby the turn-up is completed.

(27) The transferring mechanism 2 returns to the stand-by position L1 and the element 53 for transferring a bead and pushing ply turn-up bladders returns to the stand-by position.

In another embodiment, a green carcass is not formed by a green tire former but formed by another band forming machine. This green carcass is set to the shaping former section 31, and thereafter bead setting, shaping and turn-up might be carried out by an apparatus of the present invention.

INDUSTRIAL APPLICABILITY

According to the present invention, pushing of the ply turn-up bladders is carried out by the bead setting mechanism, so that a conventional bladder pushing mechanism can be omitted. In addition, one of the beads is transferred by the transferring mechanism, so that one of the bead transferring mechanism can be omitted. As a result, the apparatus can be simplified and maintenance of bead setting accuracy becomes easy. Further, maintenance of accuracy of the forming apparatus becomes easy. Still further, the total length of the apparatus can be shortened. Because driving of the segments of the belt-tread assembly holding element is carried out by hydraulic cylinders, movement of the segments due to pressure generated in the green carcass at the shaping can be prevented so that the outer diameter of the belt is not undesirably expanded. As a result, production of a defective tire can be prevented. The transferring mechanism is provided with the green tire take-out mechanism, so that a green tire take-out mechanism having been separately arranged can be omitted, whereby the apparatus is simplified and efficiency of take-out work is improved.

According to the forming method of the present invention, the transferring mechanism for the belt-tread assembly transfers the element for transferring a bead and pushing ply turn-up bladders, holding a bead, of the bead setting mechanism from the stand-by position to the bead setting position on the green tire forming mechanism and thereby the bead lock is completed. At the same time, the element for transferring a bead and pushing ply turn-up bladders, holding a bead, of the second bead setting mechanism is transferred by the driving section from the stand-by position to the bead setting position on the green tire forming mechanism and thereby the bead lock is completed. Thereafter the cylindrical carcass on the green tire forming mechanism is formed in toroidal shape and both edge portions of the carcass is turned up by expansion of the turn-up bladders. At this time, the transferring mechanism transfers the element for transferring a bead and pushing ply turn-up bladders from the stand-by position toward the green tire forming mechanism and the expanded turn-up bladders are pushed from side face. At the same time, the element for transferring a bead and pushing ply turn-up bladders is transferred toward the green tire forming mechanism by the driving section and the expanded turn-up bladders are pushed from side face. Thus each turn-up of the edges of the carcass is completed.

According to the first aspect of the present invention, a function of pushing ply turn-up bladders is added to a bead setting mechanism of a conventional green tire forming apparatus, so that a conventional bladder pushing mechanism can be omitted to simplify the apparatus.

According to the second aspect of the present invention, driving of the segments of the belt-tread assembly holding element is carried out by hydraulic cylinders, movement of the segments due to pressure generated in the green carcass at the shaping can be prevented so that the outer diameter of the belt is not undesirably expanded. As a result, production of a defective tire can be prevented.

According to the third aspect of the present invention, the transferring mechanism is equipped with the green tire take-out mechanism, so that a green tire take-out mechanism having been separately provided can be omitted to simplify the apparatus and improve efficiency of take-out works.

We claim:

1. A method of forming a green tire, the steps comprising:
   forming a belt/tread assembly to be applied to a green tire carcass;
   forming a green tire carcass on a green tire forming means;
   providing a transferring means including hydraulic support means having
   a plurality of supporting segments, each of said segments having a corresponding piston with a piston chamber, said piston chamber being divided into a first chamber and a second chamber, said first chamber being filled with air and said second chamber being filled with a non-compressible fluid;
   forcing the non-compressible fluid into said second chamber for causing each of the segments to engage the surface of the belt/tread assembly;
   transferring the belt/tread assembly to the green tire forming means using the transferring means;
   forming a green tire by inflating the green tire carcass, using the green tire forming means, into engagement with the belt/tread assembly while holding the belt/tread assembly in a substantially fixed radial position with respect to and against a green tire carcass using the hydraulic support means.

2. The method for forming a green tire as recited in claim 1, where a hydraulic pressure is applied against said belt/tread assembly by said hydraulic support means within a range of between 0 to 210 Kg/cm$^2$.

3. The method for forming a green tire as recited in claim 1, wherein said hydraulic holding means further comprises:
   switch means for forcing air into said first chamber of each of said pistons for retracting each of said plurality of segments and forcing non-compressible hydraulic fluid into said second chamber for causing each of said segments to move radially inwardly into engagement with the belt/tread assembly.

4. The method for forming a green tire as recited in claim 3, further comprising removing a finished green tire from the green tire forming means using the transferring means, wherein said transferring means includes a pair of tire pressing rollers and a green tire bucket support.

5. A green tire forming apparatus comprising:
   means for forming a belt/tread assembly to be applied to a green tire carcass;
   means disposed adjacent to said belt/tread forming means for transferring the belt/tread assembly;
   means for forming a green tire by inflating the green tire carcass against the belt/tread assembly;
   said transferring means including hydraulic support means for holding the belt/tread assembly in a substantially fixed radial position with respect to and against the green tire carcass as the green tire carcass is inflated by the green tire forming means, said hydraulic support means further comprising,
   a plurality of segments for engaging the outer surface of the belt/tread assembly,
   each of said segments having a corresponding piston with a piston chamber, said piston chamber being divided into a first chamber and a second chamber, said first chamber being filled with air and said second chamber being filled with a non-compressible fluid; and
   hydraulic drive means for causing flow of non-compressible fluid into said second chamber thereby bringing each of said segments into engagement with the belt/tread assembly.

6. The green tire forming apparatus as recited in claim 5, wherein said hydraulic support means applies a hydraulic pressure against said belt/tread assembly within a range of between 0 to 210 Kg/cm$^2$.

7. The green tire forming apparatus as recited in claim 5, wherein said hydraulic support means further comprises switch means for retracting each of said plurality of segments by directing air into said first chamber and for advancing each of the segments into engagement with the belt/tread assembly by directing the non-compressible hydraulic fluid into said second chamber.

8. The green tire forming apparatus as recited in claim 7, wherein said non-compressible fluid is oil.

9. The green tire forming apparatus as recited in claim 5, said transferring means further comprising a green tire removal means including a pair of tire pressing rollers and a green tire bucket support for removing a finished green tire from said green tire forming means.

* * * * *